(12) United States Patent
Qiu et al.

(10) Patent No.: US 12,633,087 B2
(45) Date of Patent: May 19, 2026

(54) SCALABLE PROMPT LEARNING FOR LARGE VISION-LANGUAGE MODELS

(71) Applicant: Robert Bosch GmbH, Stuttgart (DE)

(72) Inventors: Chen Qiu, Pittsburgh, PA (US); Xingyu Li, New Orleans, LA (US); Chaithanya Kumar Mummadi, Pittsburgh, PA (US); Madan Ravi Ganesh, Pittsburgh, PA (US); Zhenzhen Li, Gibsonia, PA (US); Wan-Yi Lin, Wexford, PA (US); Sabrina Schmedding, Tiefenbronn (DE)

(73) Assignee: Robert Bosch GmbH (DE)

( * ) Notice: Subject to any disclaimer, the term of this patent is extended or adjusted under 35 U.S.C. 154(b) by 349 days.

(21) Appl. No.: 18/371,688

(22) Filed: Sep. 22, 2023

(65) Prior Publication Data

US 2025/0104394 A1      Mar. 27, 2025

(51) Int. Cl.
*G06V 10/764* (2022.01)
*G06F 40/284* (2020.01)

(52) U.S. Cl.
CPC .......... *G06V 10/764* (2022.01); *G06F 40/284* (2020.01)

(58) Field of Classification Search
CPC ..... G06V 10/764; G06V 10/82; G06F 40/284
USPC ........................................ 382/159
See application file for complete search history.

(56) References Cited

U.S. PATENT DOCUMENTS

2024/0203085 A1* 6/2024 Bangalath ............. G06T 1/0021
2024/0386887 A1* 11/2024 Kumar ................ G10L 15/1815

OTHER PUBLICATIONS

Guanghao Li, Wansen Wu, Yan Sun, Li Shen, Baoyuan Wu, Dacheng Tao; "Visual Prompt Based Personalized Federated Learning"; Mar. 15, 2023 https://doi.org/10.48550/arXiv.2303.08678 (Year: 2023).*
Adrian Bulat and Georgios Tzimiropoulos. Lasp: Text-to-text optimization for language-aware soft prompting of vision language models. In Proceedings of the IEEE/CVF Conference on Computer Vision and Pattern Recognition (CVPR), pp. 23232-23241, Jun. 2023.
Shengchao Chen, Guodong Long, Tao Shen, Tianyi Zhou, and Jing Jiang. Spatial-temporal prompt learning for federated weather forecasting. arXiv preprint arXiv:2305.14244, 2023.
Hongchang Gao, My T Thai, and Jie Wu. When decentralized optimization meets federated learning. IEEE Network, 2023.

(Continued)

*Primary Examiner* — Charlotte M Baker
(74) *Attorney, Agent, or Firm* — Dickinson Wright PLLC

(57) ABSTRACT

A method of generating text-driven prompts and class prediction probabilities using a vision-language model (VLM) includes receiving candidate class names associated with a plurality of candidate classes for images, generating class text tokens based on a text description of the candidate class names, and generating a plurality of context prompt vectors using a prompt generator. The context prompt vectors define context information associated with an image classification task to be performed by the VLM. The method further includes generating prompts for each of the plurality of candidate classes by appending respective class text tokens to the context prompt vectors for each of the plurality of candidate classes, and, using the VLM, generating and outputting a class prediction probability for a sample image based on the plurality of context prompt vectors.

20 Claims, 13 Drawing Sheets

(56) References Cited

OTHER PUBLICATIONS

Peng Gao, Shijie Geng, Renrui Zhang, Teli Ma, Rongyao Fang, Yongfeng Zhang, Hongsheng Li, and Yu Qiao. Clip-adapter: Better vision-language models with feature adapters. arXiv preprint arXiv:2110. 04544, 2021.

Tao Guo, Song Guo, Junxiao Wang, Xueyang Tang, and Wenchao Xu. Promptfl: Let federated participants cooperatively learn prompts instead of models-federated learning in age of foundation model. IEEE Transactions on Mobile Computing, 2023.

Shaunak Halbe, James Seale Smith, Junjiao Tian, and Zsolt Kira. Hepco: Data-free heterogeneous prompt consolidation for continual federated learning. arXiv preprint arXiv:2306.09970, 2023.

Chao Jia, Yinfei Yang, Ye Xia, Yi-Ting Chen, Zarana Parekh, Hieu Pham, Quoc Le, Yun-Hsuan Sung, Zhen Li, and Tom Duerig. Scaling up visual and vision-language representation learning with noisy text supervision. In International conference on machine learning, pp. 4904-4916. PMLR, 2021.

Menglin Jia, Luming Tang, Bor-Chun Chen, Claire Cardie, Serge Belongie, Bharath Hariharan, and Ser-Nam Lim. Visual prompt tuning. In European Conference on Computer Vision, pp. 709-727. Springer, 2022.

Muhammad Uzair Khattak, Hanoona Rasheed, Muhammad Maaz, Salman Khan, and Fahad Shah-baz Khan. Maple: Multi-modal prompt learning. In Proceedings of the IEEE/CVF Conference on Computer Vision and Pattern Recognition (CVPR), pp. 19113-19122, Jun. 2023.

Guanghao Li, Wansen Wu, Yan Sun, Li Shen, Baoyuan Wu, and Dacheng Tao. Visual prompt based personalized federated learning. arXiv preprint arXiv:2303.08678, 2023.

Xingyu Li, Zhe Qu, Shangqing Zhao, Bo Tang, Zhuo Lu, and Yao Liu. Lomar: A local defense against poisoning attack on federated learning. IEEE Transactions on Dependable and Secure Computing, 2021.

Wang Lu, Xixu Hu, Jindong Wang, and Xing Xie. Fedclip: Fast generalization and personalization for clip in federated learning. arXiv preprint arXiv:2302.13485, 2023.

Yuning Lu, Jianzhuang Liu, Yonggang Zhang, Yajing Liu, and Xinmei Tian. Prompt distribution learning. In Proceedings of the IEEE/CVF Conference on Computer Vision and Pattern Recognition, pp. 5206-5215, 2022.

Brendan McMahan, Eider Moore, Daniel Ramage, Seth Hampson, and Blaise Aguera y Arcas. Communication-efficient learning of deep networks from decentralized data. In Artificial intelli-gence and statistics, pp. 1273-1282. PMLR, 2017.

Zhe Qu, Xingyu Li, Rui Duan, Yao Liu, Bo Tang, and Zhuo Lu. Generalized federated learning via sharpness aware minimization. In International Conference on Machine Learning, pp. 18250-18280. PMLR, 2022a.

Zhe Qu, Xingyu Li, Jie Xu, Bo Tang, Zhuo Lu, and Yao Liu. On the convergence of multi-server federated learning with overlapping area. IEEE Transactions on Mobile Computing, 2022b.

Alec Radford, Jong Wook Kim, Chris Hallacy, Aditya Ramesh, Gabriel Goh, Sandhini Agar-wal, Girish Sastry, Amanda Askell, Pamela Mishkin, Jack Clark, Gretchen Krueger, and Ilya Sutskever. Learning transferable visual models from natural language super-vision. In Marina Meila and Tong Zhang (eds.), Proceedings of the 38th International Conference on Machine Learning, vol. 139 of Proceedings of Machine Learning Research, pp. 8748-8763. PMLR, Jul. 18-24, 2021. URL https://proceedings.mlr.press/v139/radford21a. html.

Shangchao Su, Mingzhao Yang, Bin Li, and Xiangyang Xue. Cross-domain federated adaptive prompt tuning for clip. arXiv preprint arXiv:2211.07864, 2022.

Jiamian Wang, Zongliang Wu, Yulun Zhang, Xin Yuan, Tao Lin, and Zhiqiang Tao. Cooperative hardware-prompt earning for snapshot compressive imaging. arXiv preprint arXiv:2306.01176, 2023.

Hantao Yao, Rui Zhang, and Changsheng Xu. Visual-language prompt tuning with knowledge-guided context optimization. In Proceedings of the IEEE/CVF Conference on Computer Vision and Pattern Recognition (CVPR), pp. 6757-6767, Jun. 2023.

Tao Yu, Zhihe Lu, Xin Jin, Zhibo Chen, and Xinchao Wang. Task residual for tuning vision-language models. In Proceedings of the IEEE/CVF Conference on Computer Vision and Pattern Recogni-tion, pp. 10899-10909, 2023.

Yuhang Zang, Wei Li, Kaiyang Zhou, Chen Huang, and Chen Change Loy. Unified vision and language prompt learning. arXiv preprint arXiv:2210.07225, 2022.

Kaiyang Zhou, Jingkang Yang, Chen Change Loy, and Ziwei Liu. Conditional prompt learning for vision-language models. In IEEE/CVF Conference on Computer Vision and Pattern Recognition (CVPR), 2022a.

Kaiyang Zhou, Jingkang Yang, Chen Change Loy, and Ziwei Liu. Learning to prompt for vision-language models. International Jour-nal of Computer Vision (IJCV), 2022b.

Beier Zhu, Yulei Niu, Yucheng Han, Yue Wu, and Hanwang Zhang. Prompt-aligned gradient for prompt tuning. arXiv preprint arXiv:2205. 14865, 2022.

Kirillov, Alexander, Eric Mintun, Nikhila Ravi, Hanzi Mao, Chloe Rolland, Laura Gustafson, Tete Xiao et al. "Segment anything." arXiv preprint arXiv:2304.02643 (2023).

Oquab, Maxime, Timothée Darcet, Théo Moutakanni, Huy Vo, Marc Szafraniec, Vasil Khalidov, Pierre Fernandez et al. "Dinov2: Learning robust visual features without supervision." arXiv preprint arXiv:2304.07193 (2023).

Minderer, M., A. Gritsenko, A. Stone, M. Neumann, D. Weis-senborn, A. Dosovitskiy, A. Mahendran, A. Arnab, M. Dehghani, and Z. Shen. "Simple open-vocabulary object detection with vision transformers. arXiv 2022." arXiv preprint arXiv:2205.06230.

Devlin, Jacob, Ming-Wei Chang, Kenton Lee, and Kristina Toutanova. "Bert: Pre-training of deep bidirectional transformers for language understanding." arXiv preprint arXiv:1810.04805 (2018).

Brown, Tom, Benjamin Mann, Nick Ryder, Melanie Subbiah, Jared D. Kaplan, Prafulla Dhariwal, Arvind Neelakantan et al. "Language models are few-shot learners." Advances in neural information processing systems 33 (2020):1877-1901.

* cited by examiner

400

440

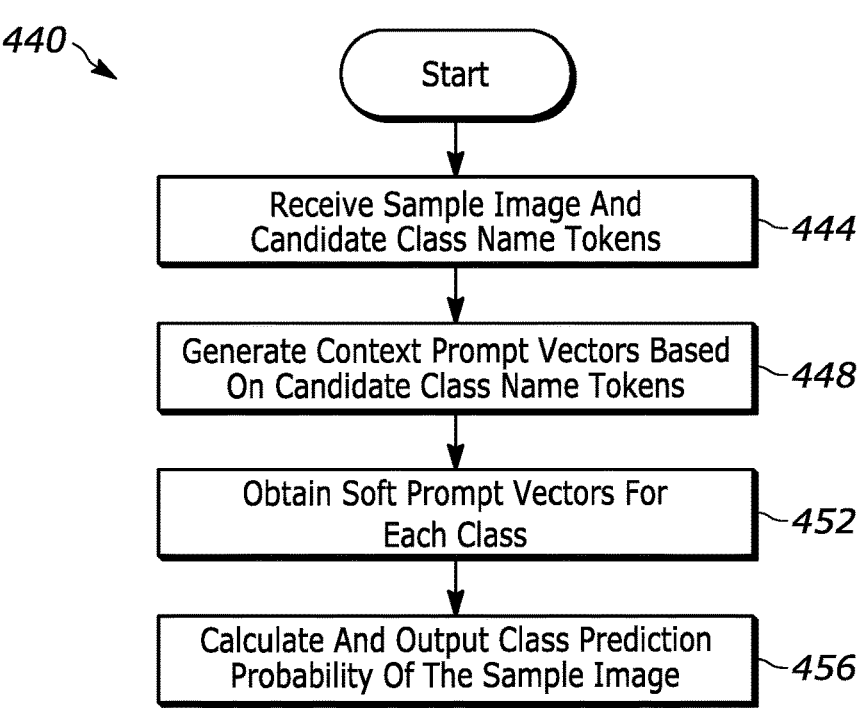

Start

Receive Sample Image And
Candidate Class Name Tokens — 444

Generate Context Prompt Vectors Based
On Candidate Class Name Tokens — 448

Obtain Soft Prompt Vectors For
Each Class — 452

Calculate And Output Class Prediction
Probability Of The Sample Image — 456

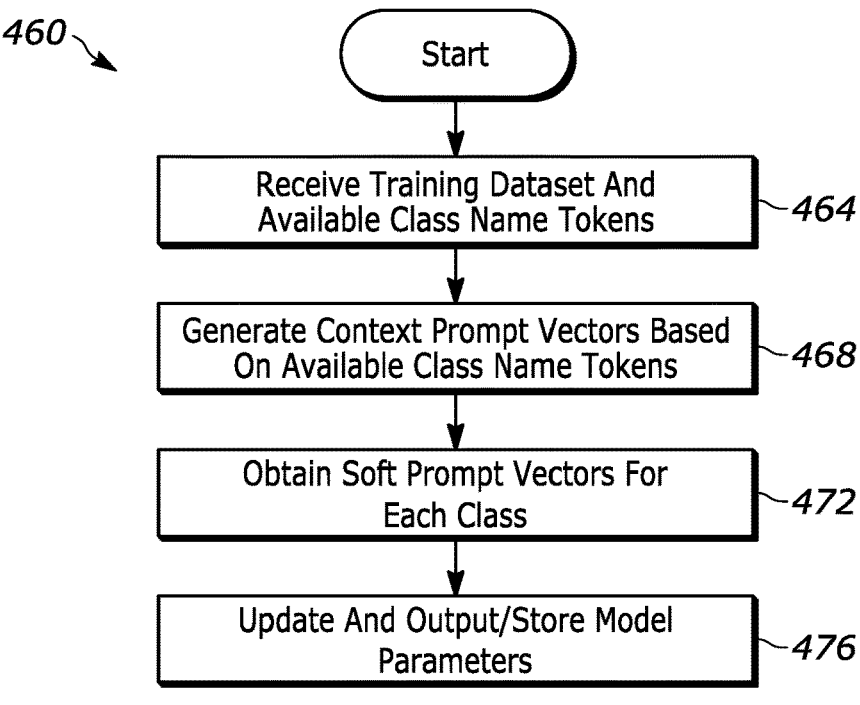

Start

Receive Training Dataset And
Available Class Name Tokens — 464

Generate Context Prompt Vectors Based
On Available Class Name Tokens — 468

Obtain Soft Prompt Vectors For
Each Class — 472

Update And Output/Store Model
Parameters — 476

FIG. 4D

SCALABLE PROMPT LEARNING FOR LARGE VISION-LANGUAGE MODELS

TECHNICAL FIELD

The present disclosure relates to prompt learning for vision-language models in computer vision systems and methods.

BACKGROUND

Computer vision systems such as image classification, image object detection, and image semantic segmentation techniques may use various models to predict, classify, detect, and label objects and regions in captured images. For example, one or more machine learning models are trained for image classification and labeling using subsets of data samples.

SUMMARY

A method of generating text-driven prompts and class prediction probabilities using a vision-language model (VLM) includes receiving candidate class names associated with a plurality of candidate classes for images, generating class text tokens based on a text description of the candidate class names, and generating a plurality of context prompt vectors using a prompt generator. The context prompt vectors define context information associated with an image classification task to be performed by the VLM. The method further includes generating prompts for each of the plurality of candidate classes by appending respective class text tokens to the context prompt vectors for each of the plurality of candidate classes, and, using the VLM, generating and outputting a class prediction probability for a sample image based on the plurality of context prompt vectors.

In other features, the VLM is a Contrastive Language-Image Pre-training (CLIP) model. The method further includes receiving the text description at an interface. Receiving the text description includes providing a pre-defined text template and receiving the text description in accordance with the predefined text template. The method further includes providing the text description to a large language model (LLM) and generating the text embeddings using the large language model. The method further includes generating the plurality of context prompt vectors using a prompt generator model $f_\theta$. The method further includes, using the prompt generator model, mapping the text embeddings to the plurality of context prompt vectors. The method further includes aggregating respective parameters of a plurality of the prompt generator models $f_\theta$ and outputting an aggregated prompt generator model based on the aggregated respective parameters. The VLM includes a text encoder and an image encoder.

A computing device configured to generate text-driven prompts and class prediction probabilities using a vision-language model (VLM) includes a processing device configured to execute instructions stored in memory to receive candidate class names associated with a plurality of candidate classes for images, generate class text tokens based on a text description of the candidate class names, generate a plurality of context prompt vectors using a prompt generator, the context prompt vectors defining context information associated with an image classification task to be performed by the VLM, generating prompts for each of the plurality of candidate classes by appending respective class text tokens to the context prompt vectors for each of the plurality of candidate classes, and, using the VLM, generate and output a class prediction probability for a sample image based on the plurality of context prompt vectors.

In other features, the VLM is a Contrastive Language-Image Pre-training (CLIP) model. An interface is configured to receive the text description. The interface is configured to provide a predefined text template and receive the text description in accordance with the predefined text template. A large language model (LLM) is configured to generate the text embeddings. A prompt generator model $f_\theta$ is configured to generate the plurality of context prompt vectors. The prompt generator model is configured to map the text embeddings to the plurality of context prompt vectors. The VLM includes a text encoder and an image encoder.

A computer-controlled machine includes at least one sensor configured to generate an input image, a control system configured to generate text-driven prompts and class prediction probabilities using a vision-language model (VLM), the control system configured to receive candidate class names associated with a plurality of candidate classes for the input image, generate a plurality of context prompt vectors using a prompt generator, the context prompt vectors defining context information associated with an image classification task to be performed by the VLM, generating prompts for each of the plurality of candidate classes by appending respective class text tokens to the context prompt vectors for each of the plurality of candidate classes, and, using the VLM, generate and output a class prediction probability for the input image based on the plurality of context prompt vectors, and an actuator configured to control an operation of the computer-controlled machine based on the class prediction probability.

In other features, the VLM is a Contrastive Language-Image Pre-training (CLIP) model. The computer-controlled machine further includes a prompt generator model $f_\theta$ configured to generate the plurality of context prompt vectors. The prompt generator model is configured to map the text embeddings to the plurality of context prompt vectors.

BRIEF DESCRIPTION OF THE DRAWINGS

FIG. 4C generally illustrates steps of an example class prediction method according to the principles of the present disclosure.

FIG. 4D generally illustrates steps of an example model training method according to the principles of the present disclosure.

DETAILED DESCRIPTION

Figure 1:
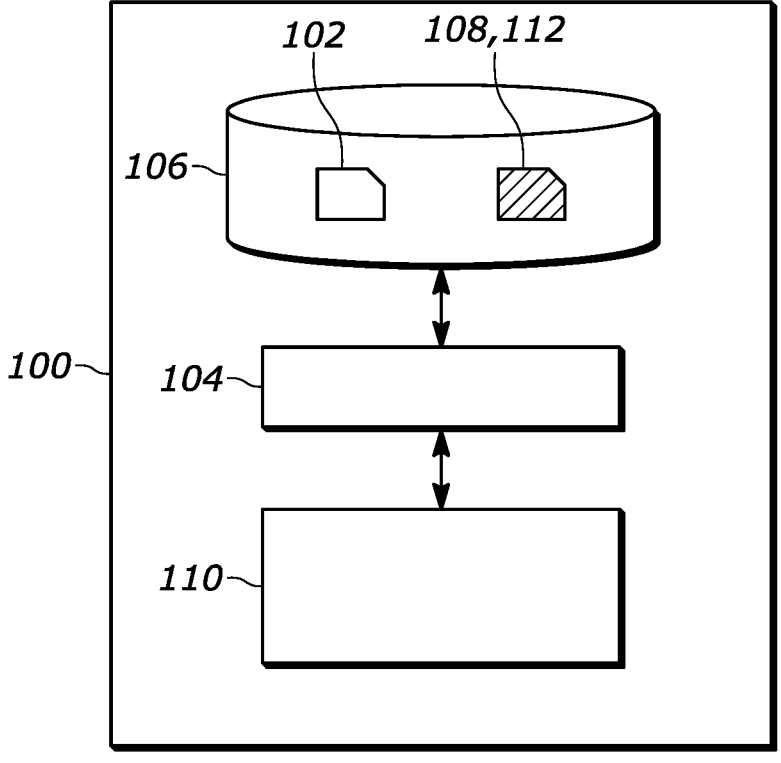
FIG. 1 generally illustrates a system for training a neural network according to the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Vision language machine learning models for computer vision systems and methods are trained using subsets of data samples from a dataset. In some examples, models are trained using a data of labeled images. However, for zero-shot prediction tasks, such as zero-shot image classification, images are classified into different categories a model that was not trained using data samples with labeled examples from the corresponding categories. For example, the model is trained used a dataset of images and text descriptions of classes of or classes of objects in the images.

In some examples, foundational vision-language (V-L) models, or VLMs, such as Contrastive Language-Image Pre-training (CLIP) models, acquire comprehensive semantic knowledge by learning from a vast collection of image and text pairs and can extract high-level features from high-dimensional inputs (e.g., images and languages). Different foundation models focus on different data modalities and different tasks.

For example, CLIP models may be used for zero-shot prediction tasks. For example, CLIP models learn a text encoder $E_{text}$ and an image encoder $E_{image}$ by training on a large number of (e.g., 400 million) image-text pairs. For predicting the class y of a query image x, one can input a set of simple text prompts (e.g., "a photo of a [CLASS]"), where the class token is replaced by the specific class name. The probability of image x belonging to class i is $$p(y = i|x) = \frac{\exp(\cos(E_{image}(x), E_{text}(c_i; \text{A photo of } a)))}{\sum_{j=1}^{k} \exp(\cos(E_{image}(x), E_{text}(c_j; \text{A photo of } a)))}.$$

However, a hand-crafted prompt prefix such as "a photo of a" is not optimal in many cases.

In some examples, Context Optimization ("CoOp") techniques are used to implement prompt learning for VLMs such as CLIP models. For example, CoOp techniques use learnable text prompt vectors to replace the hand-crafted prompt prefix such as "A photo of a" for prompting a CLIP text encoder. The prompt vectors are learned from a small subset of labeled images from the target dataset. One text prompt is learned for each class independently.

In other examples, Conditional CoOp ("CoCoOp") techniques are used to generate image-specific text prompt vectors conditioned on the image features. CoCoOp techniques improve generalization to unseen image classes relative to CoOp techniques.

In other examples, Multi-modal Prompt Learning ("MaPLe") techniques are used to learn prompt vectors for both a text encoder and an image encoder. MaPLe techniques insert the learnable prompt vectors to intermediate transformer layers, while CoOp and CoCoOp techniques only insert the prompt vectors to the input transformer layer.

These and other example techniques are configured to learn one model and one set of prompt vectors for one target classification problem. However, the foundational V-L models of these techniques are used across many different classification problems and learning one set of prompts per problem incurs significant computation cost.

Prompt generation systems and methods according to the present disclosure provide a customized image classifier for target image classification tasks using natural language descriptions about the task. For example, a prompt generator (which may also be referred to as a prompt translator or refiner) parameterized by neural networks is used to convert text descriptions (e.g., as input by a user) to context prompt vectors for large VLMs (e.g., CLIP models). For example, the hand-crafted prompt prefix (e.g., "a photo of a") can be replaced with learnable context prompt vectors (e.g., "[V_context][CLASS]") that are provided to the text encoder. The context prompt vectors converted from the text descriptions about the task provide context information about the task. The context prompt vectors can be learned for the target classification problem by minimizing the loss of the CLIP model on a few labeled images from the target dataset in a supervised manner.

A large language model provides a powerful language interface for a VLM. A Text-to-Classifier (TTC) machine learning (ML) system according to the present disclosure is comprised of the large language model, the prompt genera-
tor, and the VLM. The prompt generator is configured to
align the language model and the foundation model of the
VLM for visual data. The VLM conditioning on the context
prompt vectors facilitates prediction of the class of the
queried image. As used herein, "conditioning" refers to the
process of providing the VLM or other model with addi-
tional information (e.g., text descriptions, labels, etc.) about
the image prior to performing computer vision tasks, includ-
ing classification, object detection, and semantic segmenta-
tion. Accordingly, "conditioning on" includes providing the
additional information to the model.

In this manner, systems and methods according to the
present disclosure allow customization of an image classifier
for target image classification tasks with natural language
descriptions about the task, which are used to generate
context prompt vectors. The context prompt vectors con-
verted from the text descriptions can be generalized to
different classification problems. Accordingly, one model
learned/generated in accordance with the principles of the
present disclosure (e.g., the prompt generator) can be used
to solve different classification problems. These systems and
methods may be extended to applications beyond image
classification, such as semantic segmentation and object
detection.

FIG. 1 shows one example system 100 for training a
neural network (e.g., of an ML model). The system 100 may
be configured to (and/or include circuitry configured to)
implement the systems and methods of the present disclo-
sure described below in more detail. The system 100 may
comprise an input interface for accessing training data 102
for the neural network. For example, as illustrated in FIG. 1,
the input interface may be constituted by a data storage
interface 104 which may access the training data 102 from
data storage 106. For example, the data storage interface 104
may be a memory interface or a persistent storage interface,
e.g., a hard disk or an SSD interface, but also a personal,
local or wide area network interface such as a Bluetooth,
Zigbee or Wi-Fi interface or an ethernet or fiberoptic inter-
face. The data storage 106 may be an internal data storage
of the system 100, such as a hard drive or SSD, but also
external data storage, e.g., network-accessible data storage.

In some embodiments, the data storage 106 may further
comprise a data representation 108 of an untrained version
of the neural network which may be accessed by the system
100 from the data storage 106. It will be appreciated,
however, that the training data 102 and the data represen-
tation 108 of the untrained neural network may also each be
accessed from different data storage, e.g., via a different
subsystem of the data storage interface 104. Each subsystem
may be of a type as is described above for the data storage
interface 104.

In some embodiments, the data representation 108 of the
untrained neural network may be internally generated by the
system 100 on the basis of design parameters for the neural
network, and therefore may not explicitly be stored on the
data storage 106. The system 100 may further comprise a
processor subsystem 110 which may be configured to,
during operation of the system 100, provide an iterative
function as a substitute for a stack of layers of the neural
network to be trained. Here, respective layers of the stack of
layers being substituted may have mutually shared weights
and may receive, as input, an output of a previous layer, or
for a first layer of the stack of layers, an initial activation,
and a part of the input of the stack of layers.

The processor subsystem 110 may be further configured
to iteratively train the neural network using the training data 102. Here, an iteration of the training by the processor
subsystem 110 may comprise a forward propagation part and
a backward propagation part. The processor subsystem 110
may be configured to perform the forward propagation part
by, amongst other operations defining the forward propaga-
tion part which may be performed, determining an equilib-
rium point of the iterative function at which the iterative
function converges to a fixed point, wherein determining the
equilibrium point comprises using a numerical root-finding
algorithm to find a root solution for the iterative function
minus its input, and by providing the equilibrium point as a
substitute for an output of the stack of layers in the neural
network.

The system 100 may further comprise an output interface
for outputting a data representation 112 of the trained neural
network. This data may also be referred to as trained model
data 112. For example, as also illustrated in FIG. 1, the
output interface may be constituted by the data storage
interface 104, with said interface being in these embodi-
ments an input/output ('IO') interface, via which the trained
model data 112 may be stored in the data storage 106. For
example, the data representation 108 defining the
'untrained' neural network may, during or after the training,
be replaced, at least in part by the data representation 112 of
the trained neural network, in that the parameters of the
neural network, such as weights, hyperparameters and other
types of parameters of neural networks, may be adapted to
reflect the training on the training data 102. This is also
illustrated in FIG. 1 by the reference numerals 108, 112
referring to the same data record on the data storage 106. In
some embodiments, the data representation 112 may be
stored separately from the data representation 108 defining
the 'untrained' neural network. In some embodiments, the
output interface may be separate from the data storage
interface 104, but may in general be of a type as described
above for the data storage interface 104.

Figure 2:
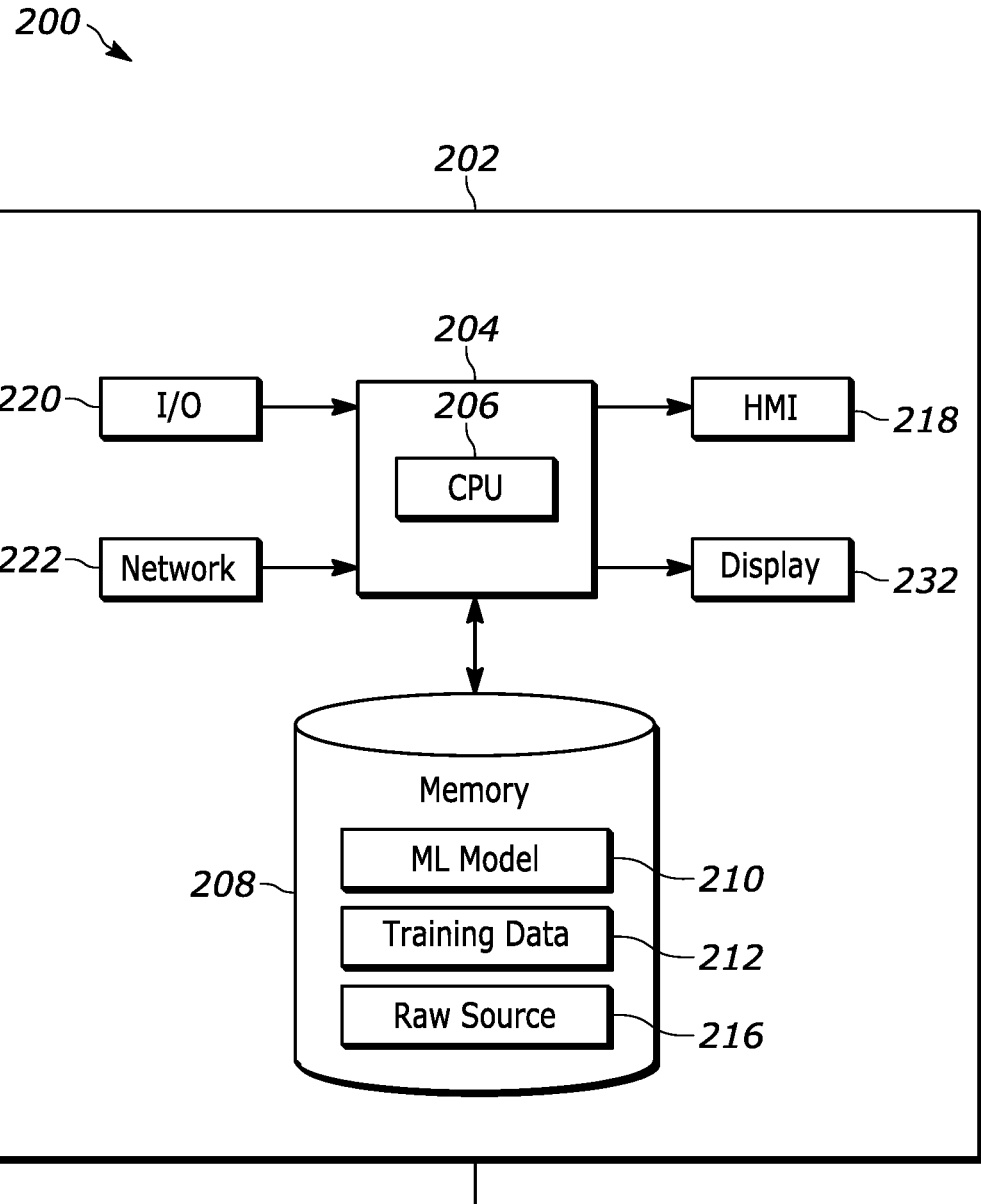
FIG. 2 generally illustrates a computer-implemented method for training and utilizing a neural network according the principles of the present disclosure.

FIG. 2 depicts a data annotation/augmentation system 200
configured to (and/or including circuitry configured to)
implement a system for annotating and/or augmenting data.
The data annotation system 200 may include at least one
computing system 202 configured to implement all or por-
tions of the systems and methods of the present disclosure
explained below in more detail. The computing system 202
may include at least one processor 204 that is operatively
connected to a memory unit 208. The processor 204 may
include one or more integrated circuits that implement the
functionality of a central processing unit (CPU) 206. The
CPU 206 may be a commercially available processing unit
that implements an instruction set such as one of the x86,
ARM, Power, or MIPS instruction set families. Various
components of the system 200 may be implemented with
same or different circuitry.

During operation, the CPU 206 may execute stored pro-
gram instructions that are retrieved from the memory unit
208. The stored program instructions may include software
that controls operation of the CPU 206 to perform the
operation described herein. In some embodiments, the pro-
cessor 204 may be a system on a chip (SoC) that integrates
functionality of the CPU 206, the memory unit 208, a
network interface, and input/output interfaces into a single
integrated device. The computing system 202 may imple-
ment an operating system for managing various aspects of
the operation.

The memory unit 208 may include volatile memory and
non-volatile memory for storing instructions and data. The
non-volatile memory may include solid-state memories,
such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 (e.g., represented in FIG. 2 as the ML Model 210) or algorithm, a training dataset 212 for the machine-learning model 210, raw source dataset 216, etc.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning model 210 that is configured to analyze the raw source dataset 216. For example, the CPU 206 and/or other circuitry may implement the machine-learning model 210. The raw source dataset 216 may include raw or unprocessed sensor data that may be representative of an input dataset for a machine-learning system. The raw source dataset 216 may include video, video segments, images, audio, text-based information, and raw or partially processed sensor data (e.g., radar map of objects). In some embodiments, the machine-learning model 210 may be a deep-learning or neural network algorithm that is designed to perform a predetermined function. For example, the neural network algorithm may be configured to identify events or objects in video segments based on audio data.

The computer system 200 may store the training dataset 212 for the machine-learning model 210. The training dataset 212 may represent a set of previously constructed data for training the machine-learning model 210. The training dataset 212 may be used by the machine-learning model 210 to learn weighting factors associated with a neural network algorithm. The training dataset 212 may include a set of source data that has corresponding outcomes or results that the machine-learning model 210 tries to duplicate via the learning process.

The machine-learning model 210 may be operated in a learning mode using the training dataset 212 as input. The machine-learning model 210 may be executed over a number of iterations using the data from the training dataset 212. With each iteration, the machine-learning model 210 may update internal weighting factors based on the achieved results. For example, the machine-learning model 210 can compare output results (e.g., annotations) with those included in the training dataset 212. Since the training dataset 212 includes the expected results, the machine-learning model 210 can determine when performance is acceptable. After the machine-learning model 210 achieves a predetermined performance level (e.g., 100% agreement with the outcomes associated with the training dataset 212), the machine-learning model 210 may be executed using data that is not in the training dataset 212. The trained machine-learning model 210 may be applied to new datasets to generate annotated data.

The machine-learning model 210 may be configured to identify a particular feature in the raw source data 216. The raw source data 216 may include a plurality of instances or input dataset for which annotation results are desired (e.g., a video stream or segment including audio data). For example only, the machine-learning model 210 may be configured to identify objects or events in a video segment based on audio data and annotate the events. The machine-learning model 210 may be programmed to process the raw source data 216 to identify the presence of the particular features. The machine-learning model 210 may be configured to identify a feature in the raw source data 216 as a predetermined feature. The raw source data 216 may be derived from a variety of sources. For example, the raw source data 216 may be actual input data collected by a machine-learning system. The raw source data 216 may be machine generated for testing the system. As an example, the raw source data 216 may include raw video and/or audio data from a camera, audio data from a microphone, etc.

In an example, the machine-learning model 210 may process raw source data 216 and output video and/or audio data including one or more indications of an identified event. The machine-learning model 210 may generate a confidence level or factor for each output generated. For example, a confidence value that exceeds a predetermined high-confidence threshold may indicate that the machine-learning model 210 is confident that the identified event (or feature) corresponds to the particular event. A confidence value that is less than a low-confidence threshold may indicate that the machine-learning model 210 has some uncertainty that the particular feature is present.

Figure 3A:
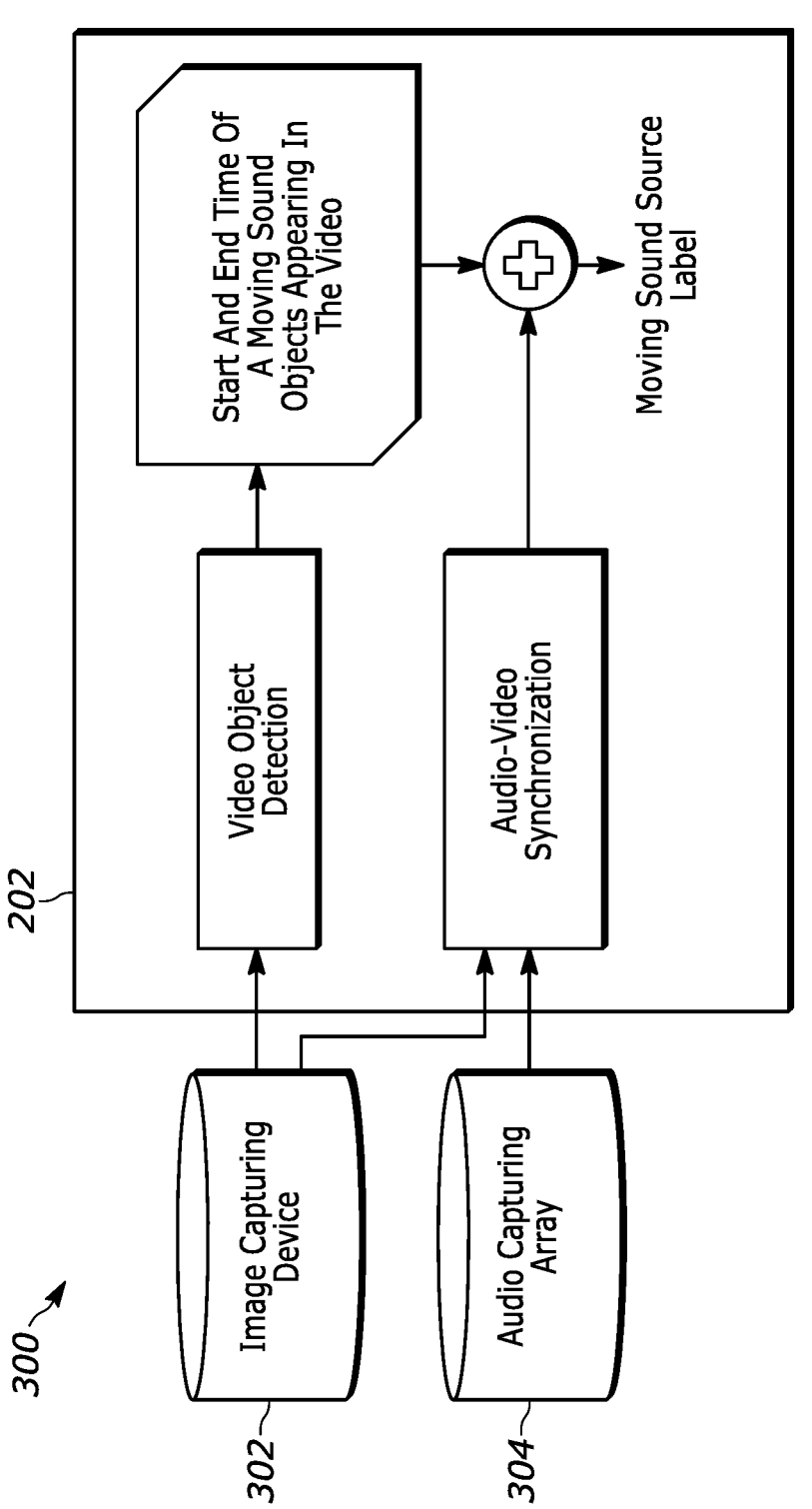
FIG. 3A generally illustrates an audio data labeling system according to the principles of the present disclosure.
Figure 3B:
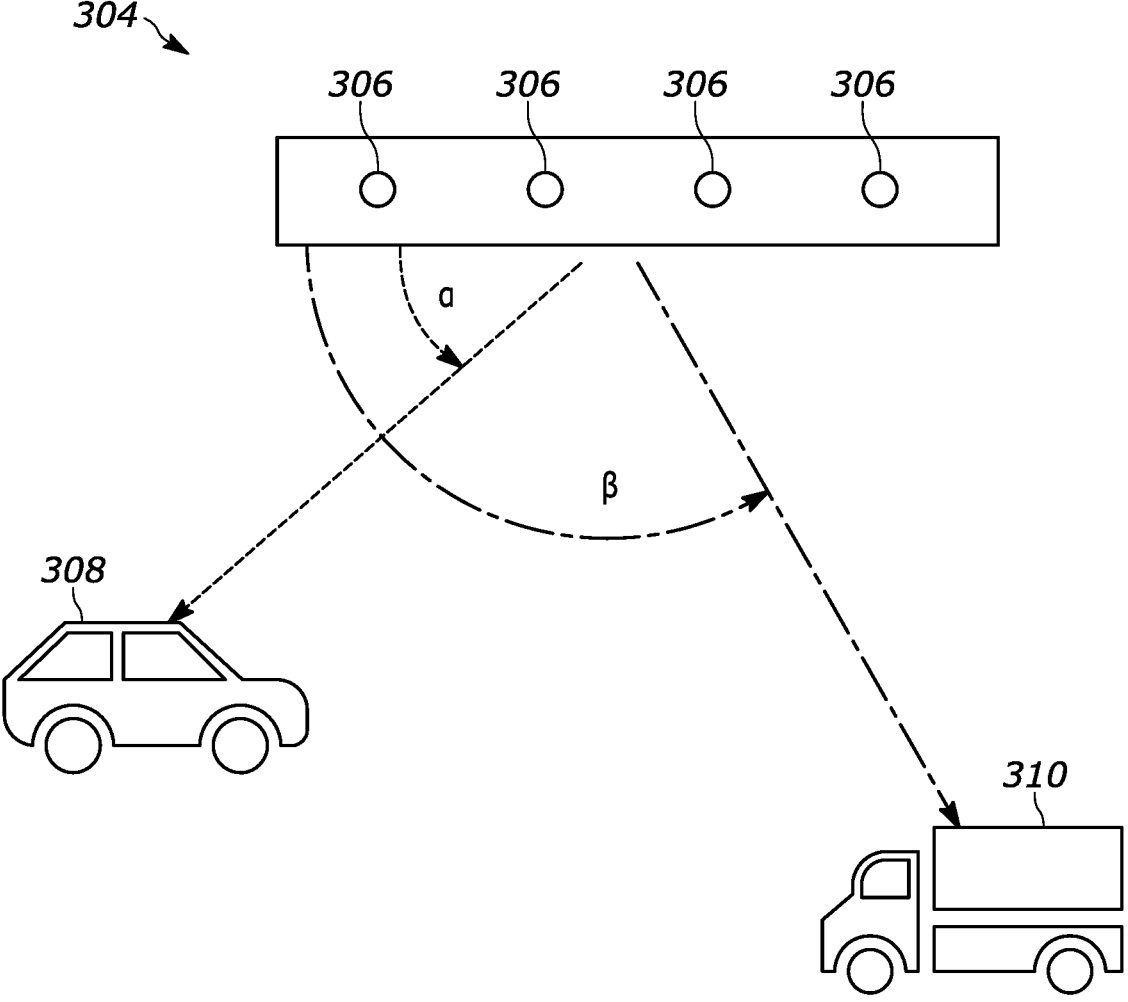
FIG. 3B generally illustrates a portion of a data capturing system according to the principles of the present disclosure.

As is generally illustrated in FIGS. 3A and 3B, a system 300 may include an image (e.g., video) capturing device 302, an audio capturing array 304, and the computing system 202. The system may receive, from the image capturing device 302, video stream data associated with a data capture environment. The system 202 may be configured to perform video object detection to identify one or more objects in corresponding images of the video stream data. The system 202 may receive, from the audio capturing array 304, audio stream data that corresponds to at least a portion of the video stream data. The audio capturing array 304 may include one or more microphones 306 or other suitable audio capturing devices. The systems and methods described herein may be configured to label, using output from at least a first machine-learning model (e.g., such as the machine-learning model 210 or other suitable machine-learning model configured to provide output including one or more object or event detection predictions), at least some objects of the video stream data and/or audio stream data.

The system 202 may calculate (e.g., using at least one probabilistic-based function or other suitable technique or function), based on at least one data capturing characteristic, at least one offset value for at least a portion of the audio stream data that corresponds to at least one labeled object of the video stream data. The system 202 may synchronize, using at least the at least one offset value, at least a portion of the video stream data with the portion of the audio stream data that corresponds to the at least one labeled object of the video stream data. The at least one data capturing characteristic may include one or more characteristics of the at least one image capturing device, one or more characteristics of the at least one audio capturing array, one or more characteristics corresponding to a location of the at least one image capturing device relative to the at least one audio capturing array, one or more characteristics corresponding to a movement of an object in the video stream data, one or more other suitable data capturing characteristics, or a combination thereof.

The system 202 may label, using one or more labels of the labeled classes or objects of the video stream data and the at least one offset value, at least the portion of the audio stream data that corresponds to the at least one labeled class or object of the video stream data. Each respective label may include an event type, an event start indicator, and an event end indicator. The system 202 may generate training data using at least some of the labeled portion of the audio stream data. The system 202 may train a second machine-learning model using the training data. The system 202 may detect, using the second machine-learning model, one or more sounds associated with audio data provided as input to the second machine-learning model. The second machine-learning model may include any suitable machine-learning model and may be configured to perform any suitable function, such as those described herein with respect to FIGS. 4-11.

Figure 3C:
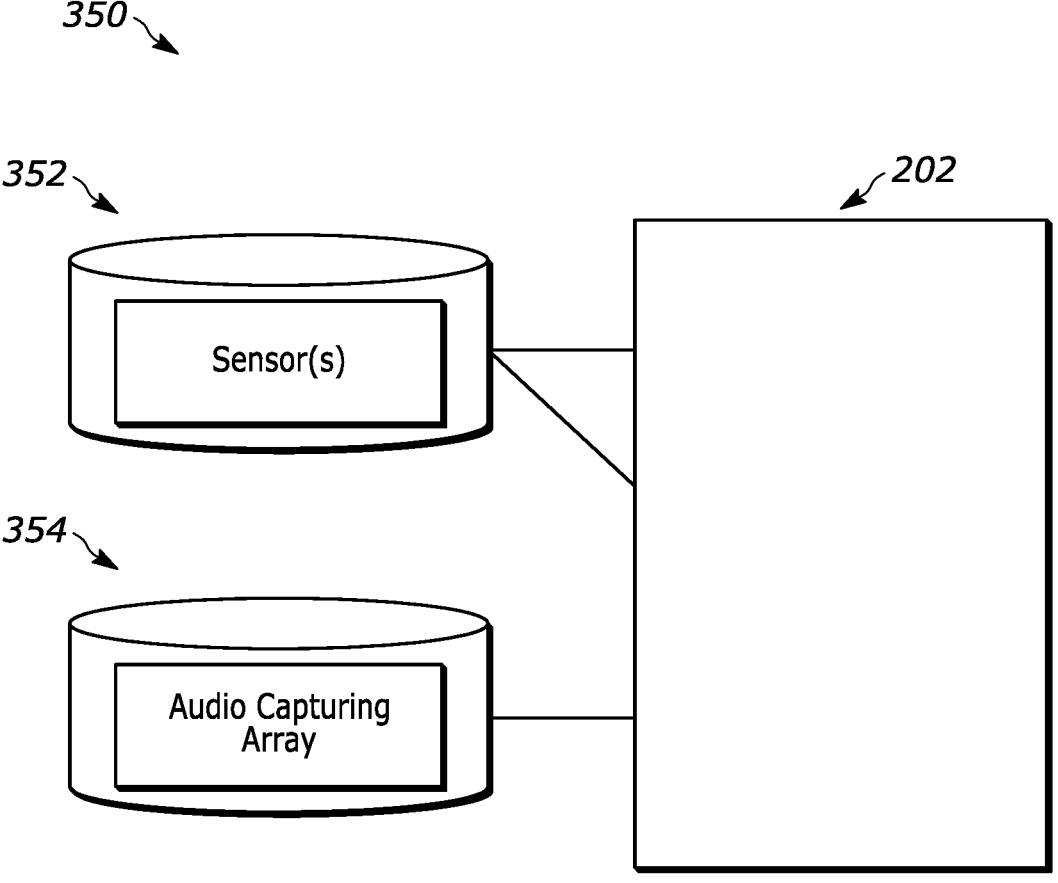
FIG. 3C generally illustrates an alternative audio data labeling system, according to the principles of the present disclosure.

In some embodiments, as is generally illustrated in FIG. 3C, the computing system 202 may be configured to label audio data based on sensor data received from one or more sensors, such as those described herein or any other suitable sensor or combination of sensors. The system 202 may receive, from the audio capturing array 354 or any suitable audio capturing device, such as one or more of the microphones 306 or other suitable audio capturing device, audio stream data associated with a data capture environment. It should be understood that the audio capturing array 354 may include features similar to those of the audio capturing array 304 and may include any suitable number of audio capturing devices. The system 202 may receive, from at least one sensor (e.g., such as the sensor 352) that is asynchronous relative to the audio capturing array 354, sensor data associated with the data capture environment. The sensor 354 may include at least one of an induction coil, a radar sensor, a LiDAR sensor, a sonar sensor, an image capturing device, any other suitable sensor, or a combination thereof. The audio capturing array 354 may be remotely located from the sensor 354, proximately located to the sensor 354, or located in any suitable relationship to the sensor 354.

The system 202 may identify, using output from at least a first machine learning model, such as the machine learning model 210 or other suitable machine learning model, at least some events in the sensor data. The machine learning model 210 may be configured to provide output including one or more event detection predictions based on the sensor data. The system 202 may synchronize at least a portion of the sensor data associated with the portion of the audio stream data that corresponds to the at least one event of the sensor data. The system 202 may label, using one or more labels extracted for respective events of the sensor data value, at least the portion of the audio stream data that corresponds to the at least one event of the sensor data. Each respective label may include an event type, an event start indicator, and an event end indicator. The system 202 may generate training data using at least some of the labeled portion of the audio stream data. The system 202 may train a second machine-learning model using the training data. The system 202 may detect, using the second machine-learning model, one or more sounds associated with audio data provided as input to the second machine-learning model. The second machine-learning model may include any suitable machine-learning model and may be configured to perform any suitable function, such as those described herein with respect to FIGS. 4-11.

Any of the systems described above and/or below in more detail may implement the prompt generation systems and methods of the present disclosure, including the prompt generator as described below in more detail.

A TTC system according to the present disclosure includes a large language model, a vision-language model (VLM), and a prompt generator (e.g., a prompt generator model) configured to align the VLM and the large language model. The large language model LLM (e.g., a transformer-based model, such as a Bidirectional Encoder Representations from Transformers (BERT) model), embeds varying-length raw text descriptions $t_{context}$ about the classification problem as text embeddings (e.g., class text tokens). The text embeddings extract and summarize context information from the raw text descriptions (e.g., raw text descriptions input by users). The text embeddings are provided as inputs to the prompt generator model.

The prompt generator model $f_\theta$ maps the varying-length text embeddings to a set of fixed-length context prompt vectors. The prompt generator model may include both cross-attention layers and following self-attention layers.

The VLM (e.g., a CLIP model, which has a text encoder $E_{text}$ and an image encoder $E_{image}$) predicts the class of the query image based on the context prompt vectors. The text encoder is a transformer model that encodes text tokens to text features. The image encoder is a vision-transformer model that encodes images to image features. At least one of the text encoder and the image encoder is conditioned on (e.g., provided with, as inputs) the context prompt vectors.

The parameters of the large language model and the vision-language model (e.g., the text encoder and the image encoder of the CLIP model) may be pre-trained and remain fixed within the TTC system. Accordingly, in some examples, only the parameters of the prompt generator model are learned using a small set of labeled images. A set of image-text pairs may be used for model training. A given set of image-text pairs (e.g., a mini-batch) may include n image-text pairs from k different image classes. A text description $t_{context}$ about the classification problem is generated with a predefined text template for training using the k image class names $c_0, \ldots, c_k$. For example, the predefined text template may be "We have images from the following classes: [class names]" where [class names] are replaced by the $i^{th}$ image class names $c_i$, and i in [k]. By feeding the text description t context to the large language model LLM and then to the prompt generator model $f_\theta$, the context prompt vectors are obtained for the classification problem for the given set of image-text pairs in accordance with:

$$V_{text}, V_{image} = f_\theta(LLM(t_{context})) \tag{1}$$

Conditioning on the context prompt vectors, the CLIP model prediction probability is:

$$p(y = i|x) = \frac{\exp(\cos(E_{image}(x; V_{image}), E_{text}(c_i; V_{text})))}{\sum_{j=1}^{k} \exp(\cos(E_{image}(x; V_{image}), E_{text}(c_j; V_{text})))} \tag{2}$$

where cos ( ) corresponds to the cosine similarity.

The parameters $\theta$ of the prompt translator model are learned by minimizing cross-entropy between the model predictions and ground-truth labels on the available image-text pairs in each mini-batch.

For inference (e.g., predicting the class of a new image), for a zero-shot image classification task, the TTC system receives, as input, a text description about the image classification problem to be performed. The text description is converted to context prompt vectors by the large language model and the prompt generator model as shown above in Equation 1. The CLIP model, conditioned on the context prompt vectors, then predicts the image class shown above in Equation 2.

As described herein, an appropriate prompt provides helpful context information of the target classification problem. However, different image classification tasks require different context. For example, classifying different pets relies upon different characteristic features than classifying different flowers, and a prompt learned for pet image classification is not optimal for flower image classification. Equations 1 and 2 are configured to generate prompt vectors based on the corresponding text description of the target image classification problem, and the prompt generator model is configured to convert a collection of candidate class names to context prompt vectors.

In some examples, text descriptions may be automatically generated from metadata associated with one or more images. For example, the text description may be "We have images for product A from a camera at machine B in the plant C," where details such as the machine B and the plant C may be obtained from metadata associated the images.

In some examples, classname-dependent prompt vectors $V_i = f_\theta(LLM(c_i))$ may be used in addition to the context prompt vector $V_{text}$. The CLIP text encoder can be conditioned on both $V_{text}$ and $V_i$ by concatenating $V_{text}$ and $V_i$ with the class name $c_i$ in the input layer of text encoder. The context prompt vectors and classname-dependent prompt vectors may be inserted into other transformation layers (e.g., as in multi-model prompt learning systems).

The above TTC system as described above can be used for tasks beyond image classification. For example, for semantic segmentation, the TTC system may include a large language model, a vision model configured for semantic segmentation, and a prompt generator configured to align the large language model and the vision model. Conversely, for image classification or object detection, the TTC system may include a large language model, a vision model configured for image classification or object detection, and a prompt generator configured to align the large language model and the vision model.

Figure 4A:
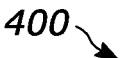
FIG. 4A generally illustrates an example interface configured to receive a text description of a target image classification problem according to the principles of the present disclosure.
Figure 4A:
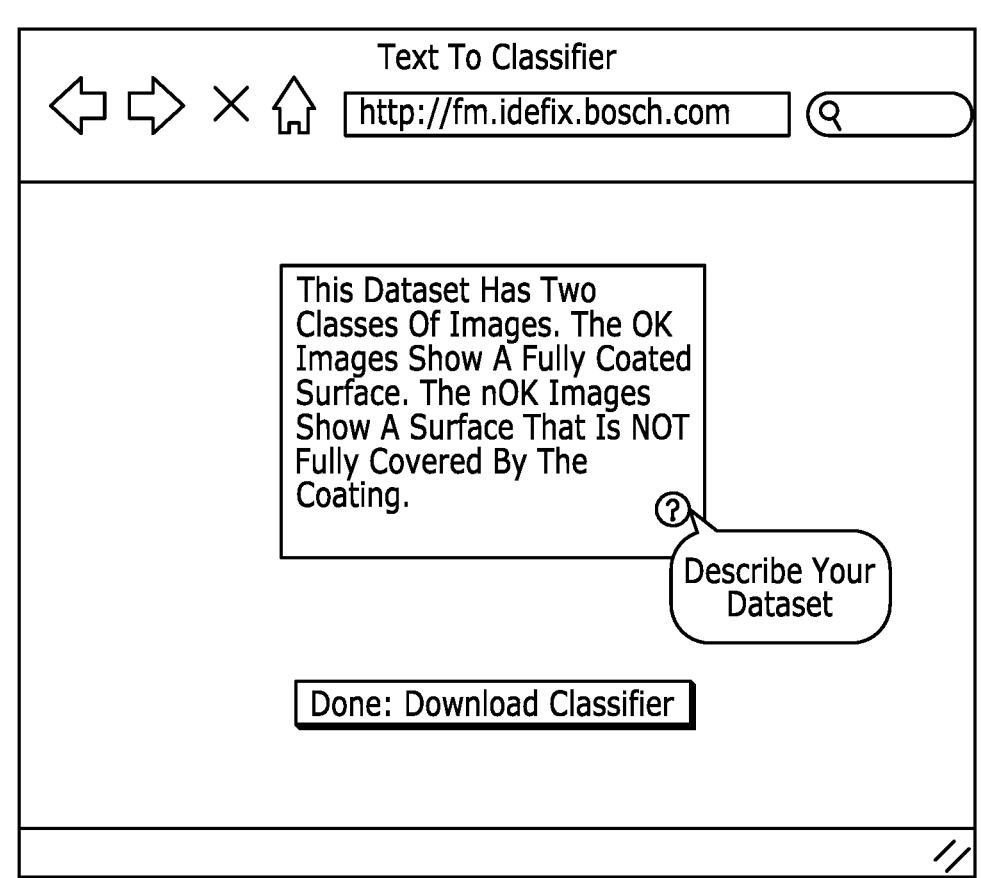

FIG. 4A shows an example interface 400 configured to receive (e.g., from a user) a text description of a target image classification problem. For example, the text description indicates two classes of images (e.g., images of a fully-coated surface and a not fully-surface).

Figure 4B:
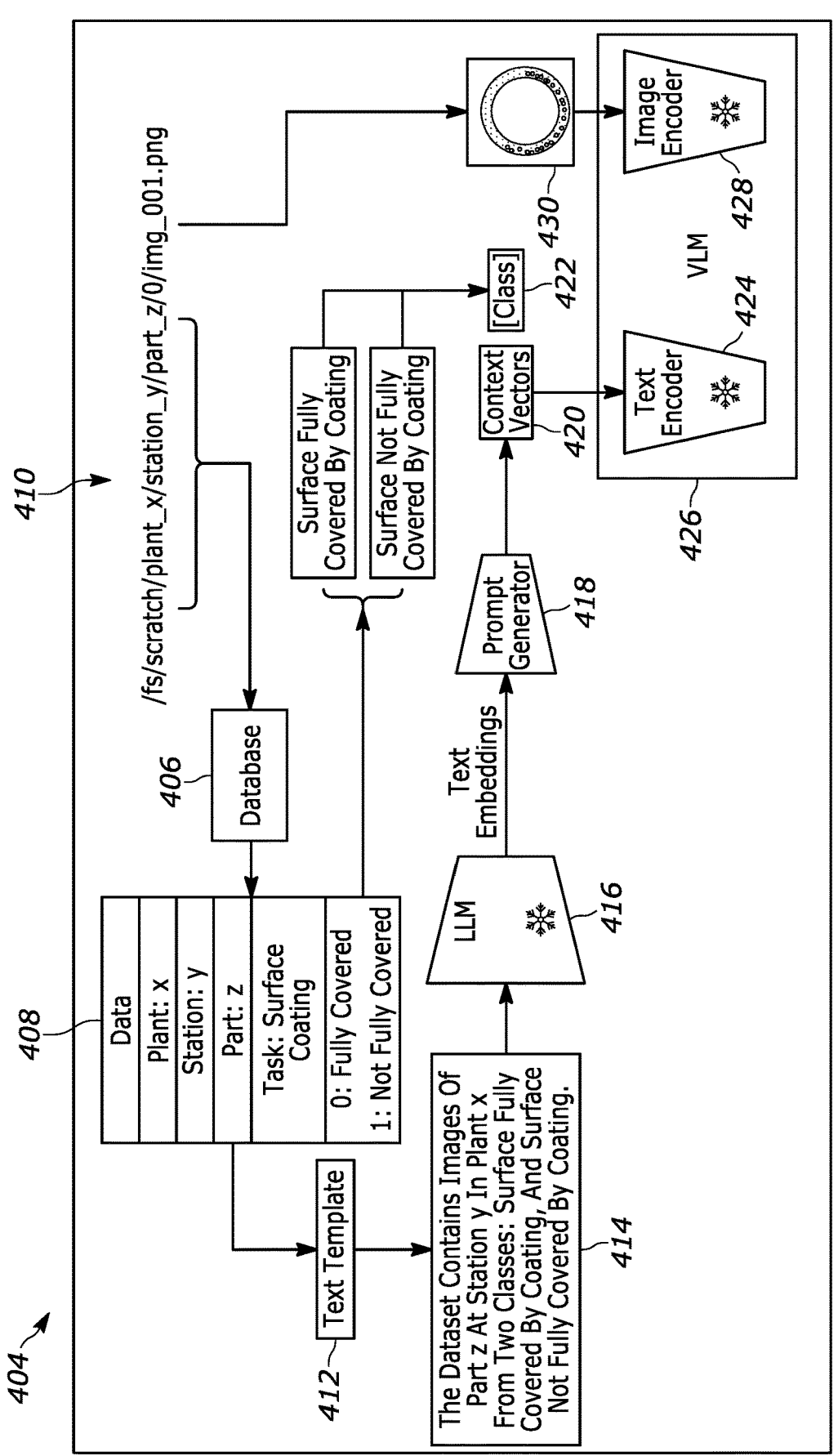
FIG. 4B generally illustrates an example functional block diagram of a text-to-classifier system according to the principles of the present disclosure.

FIG. 4B generally illustrates an example functional block diagram of a text-to-classifier system 404 to be trained according to the principles of the present disclosure. For example, one or more processors or processing devices are configured to execute instructions to implement the system 404, such as one or more of the processors of the systems described herein.

At database 406 is populated with data 408 associated with one or more images, such as an image corresponding to an image file 410. In this example, the data may include a part shown in the image, a plant and station associated with the part, a task (e.g., a surface coating) associated with the part, and classes associated with the part shown in the image (e.g., a surface fully-covered/coated and a surface not fully-covered/coated).

The system 404 provides a text template 412 (i.e., a predefined text template as described above) configured to receive a text description 414 of a target image classification problem to be performed by the system. For example, the system 404 (e.g., via an interface such as the interface 400 of FIG. 4A) receives the text description 414. The text description 414 is provided to a large language model (LLM) 416.

The large language model 416 embeds varying-length raw text descriptions $t_{context}$ about the classification problem as text embeddings, which are provided to a prompt generator 418 configured to implement a prompt generator model $f_\theta$. The prompt generator 418 maps the varying-length text embeddings to a set of fixed-length context prompt vectors 420.

The context prompt vectors 420 and the classes (as shown at 422) are provided to a text encoder 424 ($E_{text}$) of a VLM 426 (e.g., a CLIP model including the text encoder 424 and an image encoder 428 ($E_{image}$). The text encoder 424 encodes texts tokens as text features. Conversely, the image encoder 428 receives an image 430 (e.g., an image corresponding to the image file 410) and encodes the image 430 as image features. In this manner, the prompt generator 418 is configured to align the LLM 416 and the VLM 426. The VLM 426 being conditioned on the context prompt vectors 420 facilitates prediction of the class of the queried image. Accordingly, the VLM 426 is configured predict the class of a query image (e.g., the image 430) based on the context prompt vectors 420.

FIG. 4C illustrates steps of a class prediction method 440 implemented by the TTC system 404 and the VLM 426 according to the principles of the present disclosure. For example, one or more processors or processing devices are configured to execute instructions to implement the method 440, such as one or more of the processors of the systems described herein.

Assuming a classification problem involving n candidate classes, a set of candidate class tokens:

$$\mathcal{T} = \{c_j\}_{j=1}^n.$$

(5)

The prompt generator model $f_\theta$ with learnable parameters $\theta$ converts the set of class tokens T to m soft prompt prefix vectors as:

$$v_1, v_2, \dots, v_m = f_\theta(\mathcal{T}).$$

(10)

The prompt generator model is parameterized by a lightweight cross-attention module followed by a multi-layer perceptron (MLP). Accordingly, the soft prompt vectors for a jth class correspond to:

$$t_j = \{v_1, v_2, \dots, v_m, c_j\}.$$

Given an image x, the visual embedding is extracted with the image encoder and the text embedding is extracted with the text encoder. The prediction probability is calculated according to:

$$p_\theta(y|x) = \frac{\exp\big(\cos(E_{image}(x), E_{text}(t_y))/\tau\big)}{\sum_j^n \exp\big(\cos(E_{image}(x), E_{text}(t_j))/\tau\big)},$$ (Equation 3)

which is a variation of Equation 2 above.

Accordingly, at 444, the method 440 collects/receives test data $x_{test}$ (e.g., a sample image) and candidate class name tokens $T_{test}$. At 448, the method 440 generates (e.g., using the prompt generator model $f_\theta$) context prompt vectors v based on the test data and the candidate class name tokens in accordance with $V_i=f_\theta((T_{test}))$, where $V_i$ corresponds to tokenized soft prompt prefix vectors $V_1, V_2, \dots V_m$. At 452, the method 440 obtains the soft prompt vectors for each class according to $t_j=\{v_1, v_2, \dots, v_m, c_j\}$.

At 456, the method 440 calculates and outputs the class prediction probability of the sample image in accordance with Equation 3.

FIG. 4D generally illustrates steps of an example model training method 460 implemented by the TTC system 404 and the VLM 426 according to the principles of the present disclosure. For example, one or more processors or processing devices are configured to execute instructions to implement the method 440, such as one or more of the processors of the systems described herein.

For example, a generalization federated learning setting may include a central server and N different remote clients, indexed as N=[1, 2, . . . , N]. The i-th client has a local dataset with labeled images $(x_i, y_i)\sim$Di, and $n^i$ available class names. All clients have disjoint data distributions (i.e., both images and class names at different clients are not overlapping).

The goal is to learn a generalized prompt generator model $f_\theta$ with learnable parameters $\theta$. The prompt generator model $f_\theta$ is configured to convert the collection of candidate class names to context prompt vectors for the target image classification problem. Each client updates the model parameter $\theta$ locally by minimizing the loss of the CLIP model on respective private data Di. The model parameter $\theta$ as calculated to minimize loss at a given client corresponds to:

$$L_{clip}^i(\theta) = -\mathbb{E}_{(x,y)\in\mathcal{D}_i}\log p_\theta(y|x).$$ (Equation 4)

The model parameters are aggregated (e.g., at the central server) as follows:

$$\theta^* = \frac{1}{N}\sum_{i=1}^N \arg\min_\theta L_{clip}^i(\theta).$$ (Equation 5)

Accordingly, at 464, the method 460 collects/receives a local training dataset Di and available class name tokens $T_i$. At 468, the method 460 generates (e.g., using the prompt generator model $f_\theta$) context prompt vectors v based on training dataset and the available class name tokens in accordance with $V_i=f_\theta((T_i))$. At 472, the method 460 obtains the soft prompt vectors for each class according to $t_j=\{v_1, v_2, \dots, v_m, c_j\}$.

At 476, the method 460 updates and stores and/or outputs the model parameters $\theta$ and the aggregated model parameter in accordance with Equations 4 and 5.

Figure 5:
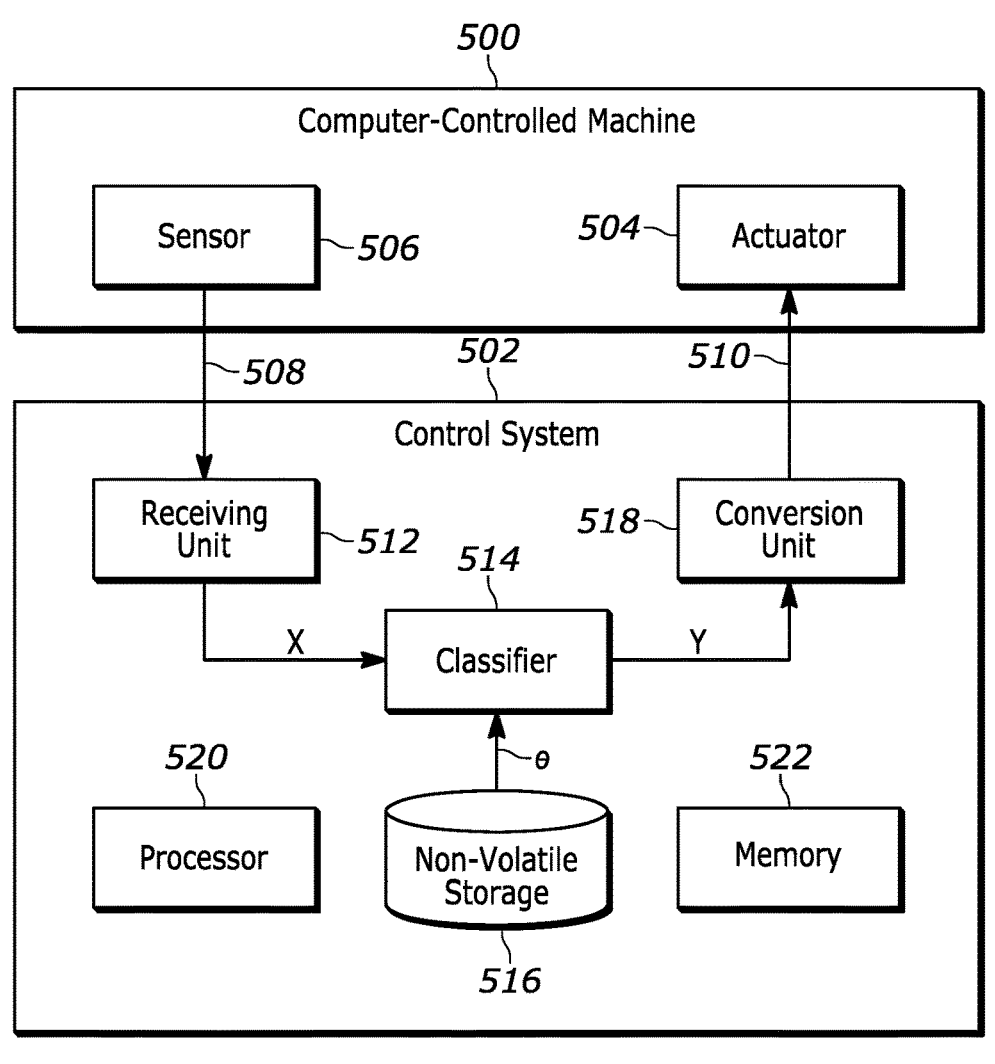
FIG. 5 depicts a schematic diagram of an interaction between a computer-controlled machine and a control system according to the principles of the present disclosure.

FIGS. 5-11 depict example systems and devices that may implement model training and/or class prediction systems and methods according to the present disclosure. FIG. 5 depicts a schematic diagram of an interaction between a computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In some embodiments, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to produce each input signal x. Input signal x may include data corresponding to an image recorded by sensor 506.

Control system 502 includes classifier 514. Classifier 514 may be configured to classify input signals x into one or more labels using a machine-learning (ML) algorithm, such as a neural network. For example, the classifier 514 corresponds to the classifier 408 described above. Classifier 514 is configured to be parametrized by parameters, such as those described above (e.g., parameter $\theta$). Parameters $\theta$ may be stored in and provided by non-volatile storage 516.

Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more anomaly detection methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the anomaly detection methodologies as disclosed herein. Non-volatile storage 516 may also include data supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
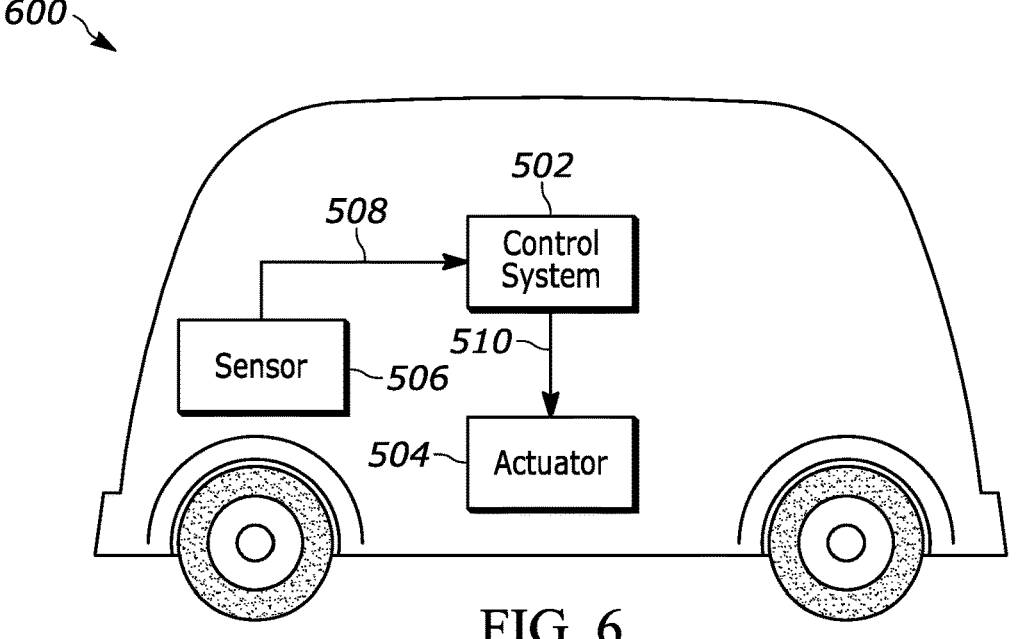
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to the principles of the present disclosure.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In some embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In some embodiments, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
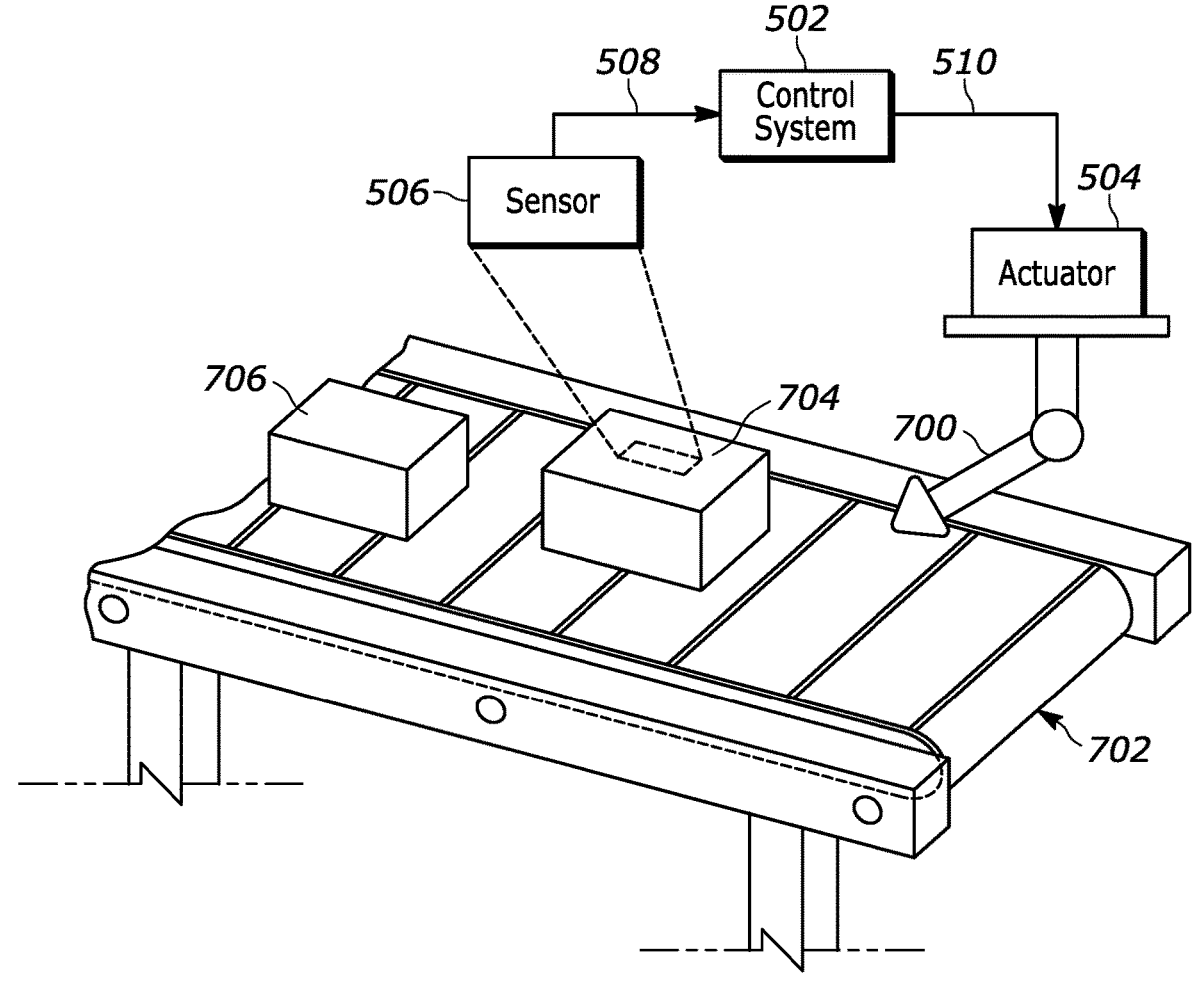
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manu-facturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
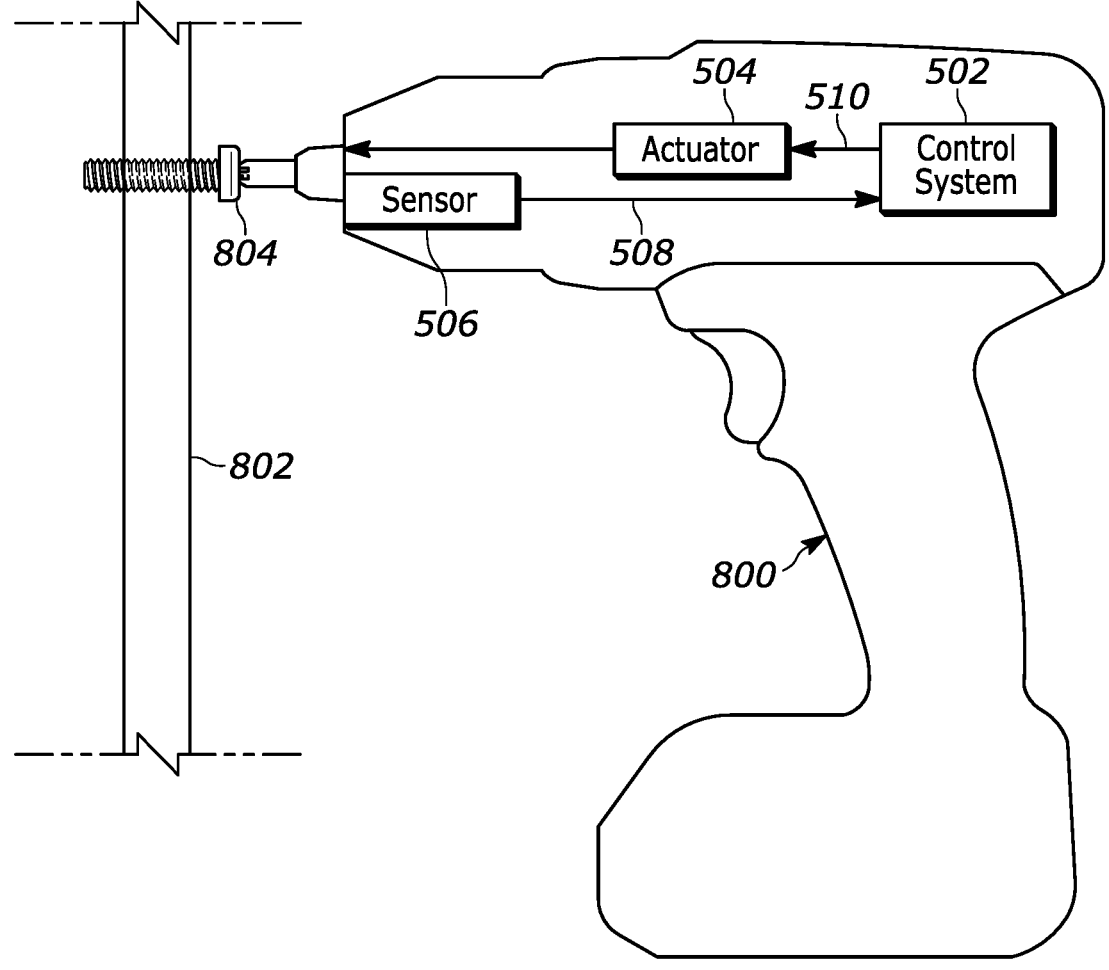
FIG. 8 depicts a schematic diagram of the control system of FIG. 5 configured to control a power tool, such as a power drill or driver that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
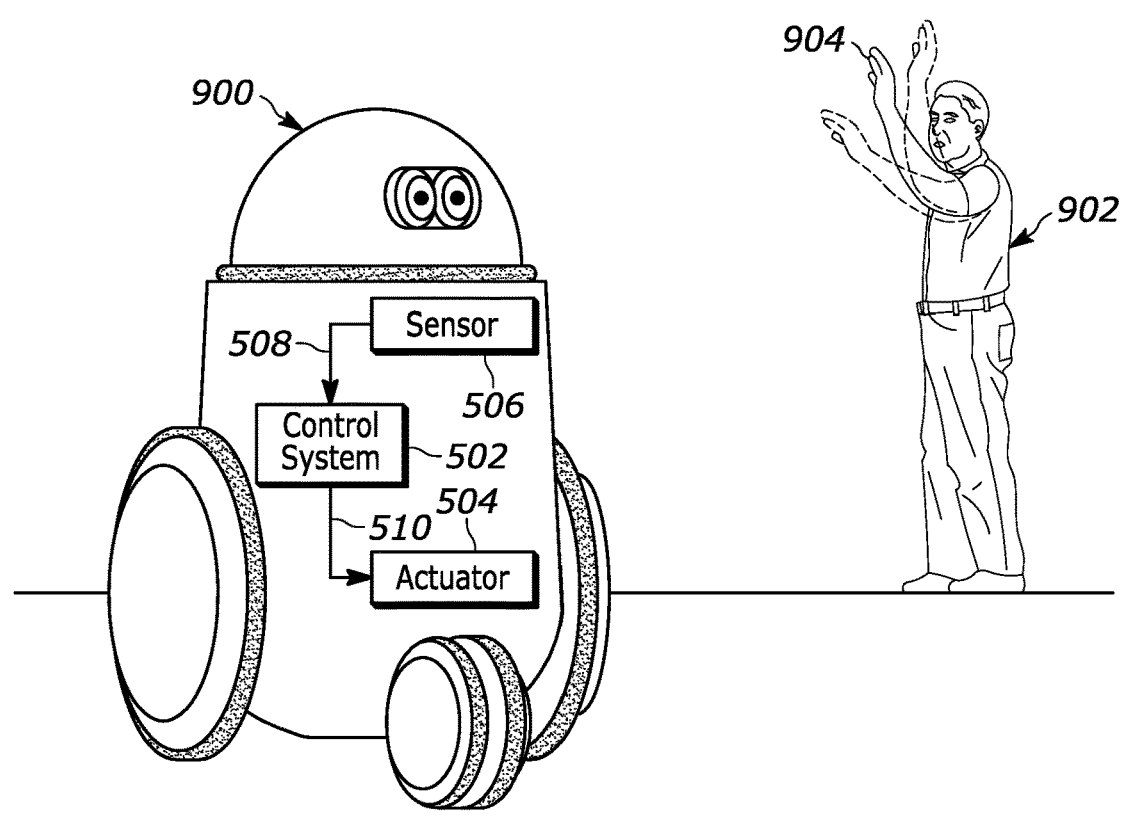
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
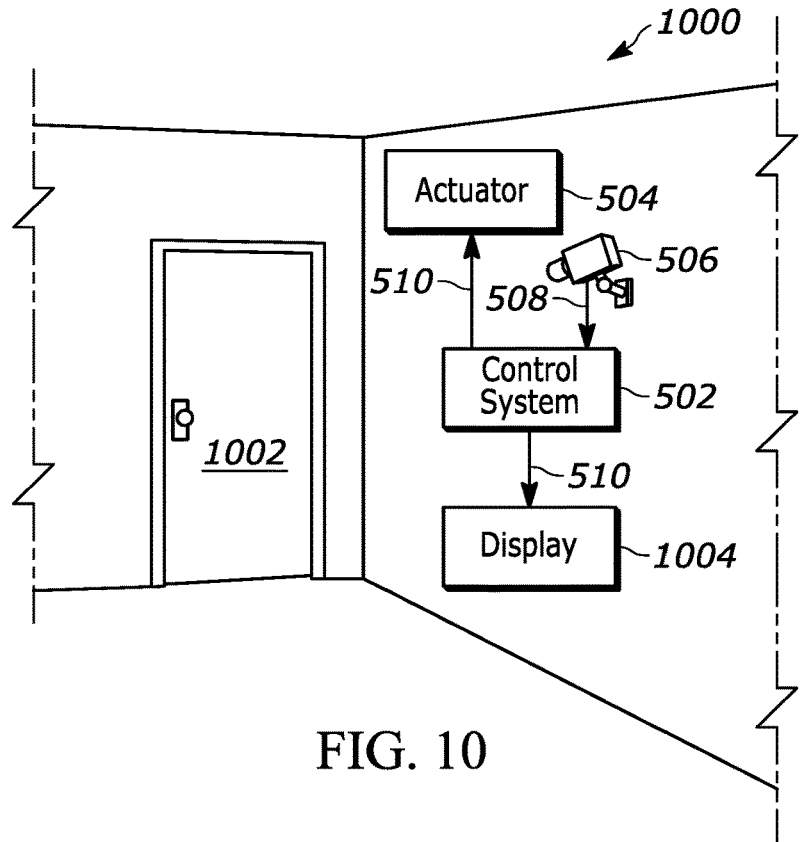
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
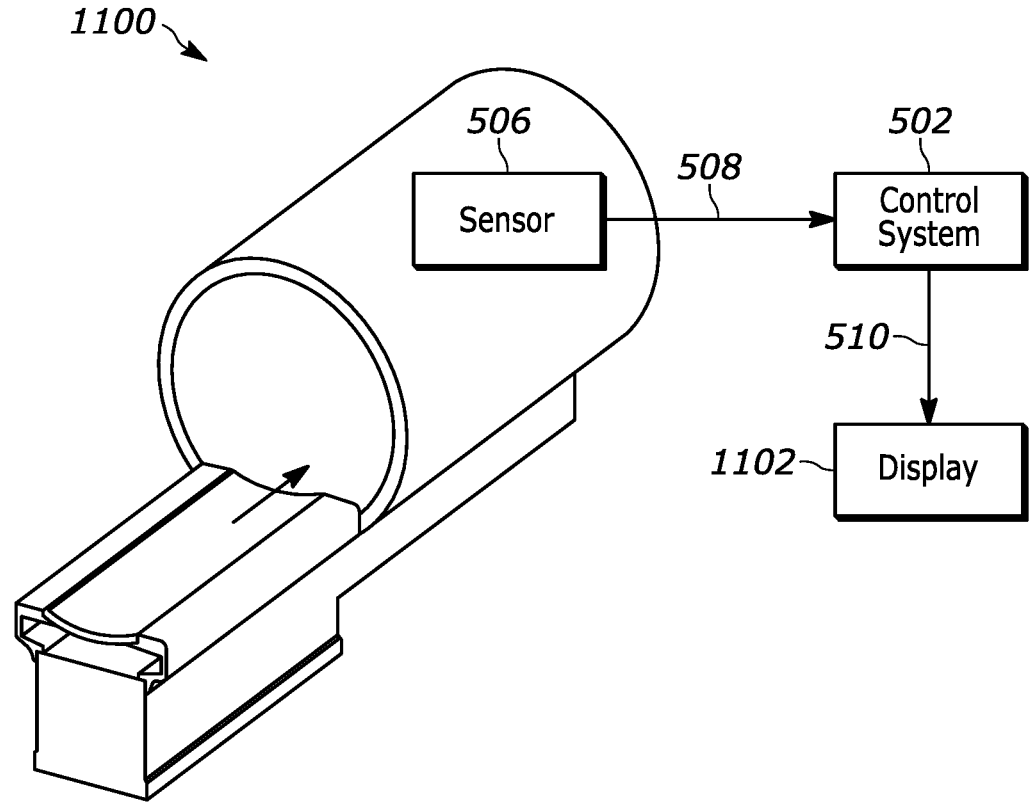
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of generating text-driven prompts and class prediction probabilities using a vision-language model (VLM), the method comprising:

receiving candidate class names associated with a plurality of candidate classes for images;

generating class text tokens based on a text description of the candidate class names;

generating, based on the text description and separate from the class text tokens, a plurality of context prompt vectors using a prompt generator, wherein the context prompt vectors define context information associated with an image classification task to be performed by the VLM;

subsequent to generating the plurality of context prompt vectors, generating prompts for each of the plurality of candidate classes by appending respective class text tokens to the context prompt vectors for each of the plurality of candidate classes; and using the VLM, generating and outputting a class prediction probability for a sample image based on the plurality of context prompt vectors, wherein using the VLM includes providing, to a text encoder of the VLM, the context prompt vectors.

2. The method of claim 1, wherein the VLM is a Contrastive Language-Image Pre-training (CLIP) model.

3. The method of claim 1, further comprising receiving the text description at an interface.

4. The method of claim 3, wherein receiving the text description includes providing a predefined text template and receiving the text description in accordance with the predefined text template.

5. The method of claim 1, further comprising providing the text description to a large language model (LLM) and generating the text embeddings using the large language model.

6. The method of claim 1, further comprising generating the plurality of context prompt vectors using a prompt generator model $f_\theta$.

7. The method of claim 6, further comprising, using the prompt generator model $f_\theta$, mapping the text embeddings to the plurality of context prompt vectors.

8. The method of claim 6, further comprising aggregating respective parameters of a plurality of the prompt generator models $f_\theta$ and outputting an aggregated prompt generator model based on the aggregated respective parameters.

9. A computing device configured to generate text-driven prompts and class prediction probabilities using a vision-language model (VLM), the computing device including a processing device configured to execute instructions stored in memory to:

receive candidate class names associated with a plurality of candidate classes for images;

generate class text tokens based on a text description of the candidate class names;

generate, based on the text description and separate from the class text tokens, a plurality of context prompt vectors using a prompt generator, wherein the context prompt vectors define context information associated with an image classification task to be performed by the VLM;

subsequent to generating the plurality of context prompt vectors, generate prompts for each of the plurality of candidate classes by appending respective class text tokens to the context prompt vectors for each of the plurality of candidate classes; and using the VLM, generate and output a class prediction probability for a sample image based on the plurality of context prompt vectors, wherein using the VLM includes providing, to a text encoder of the VIM, the context prompt vectors.

10. The computing device of claim 9, wherein the VLM is a Contrastive Language-Image Pre-training (CLIP) model.

11. The computing device of claim 9, further comprising an interface configured to receive the text description.

12. The computing device of claim 11, wherein the interface is configured to provide a predefined text template and receive the text description in accordance with the predefined text template.

13. The computing device of claim 9, further comprising a large language model (LLM) configured to generate the text embeddings.

14. The computing device of claim 9, further comprising a prompt generator model $f_\theta$ configured to generate the plurality of context prompt vectors.

15. The computing device of claim 14, wherein the prompt generator model is configured to map the text embeddings to the plurality of context prompt vectors.

16. The computing device of claim 9, wherein the VLM includes the text encoder and an image encoder.

17. A computer-controlled machine, comprising:

at least one sensor configured to generate an input image;

a control system configured to generate text-driven prompts and class prediction probabilities using a vision-language model (VLM), the control system configured to receive candidate class names associated with a plurality of candidate classes for the input image, generate, based on the text description and separate from the class text tokens, a plurality of context prompt vectors using a prompt generator, wherein the context prompt vectors define context information associated with an image classification task to be performed by the VLM, subsequent to generating the plurality of context prompt vectors, generate prompts for each of the plurality of candidate classes by appending respective class text tokens to the context prompt vectors for each of the plurality of candidate classes, and using the VLM, generate and output a class prediction probability for the input image based on the plurality of context prompt vectors, wherein using the VLM includes providing, to a text encoder of the VLM, the context prompt vectors; and an actuator configured to control an operation of the computer-controlled machine based on the class prediction probability.

18. The computer-controlled machine of claim 17, wherein the VLM is a Contrastive Language-Image Pre-training (CLIP) model.

19. The computer-controlled machine of claim 17, further comprising a prompt generator model $f_\theta$ configured to generate the plurality of context prompt vectors.

20. The computer-controlled machine of claim 19, wherein the prompt generator model is configured to map the text embeddings to the plurality of context prompt vectors.

* * * * *